(12) United States Patent
Asadi et al.

(10) Patent No.: US 7,121,552 B2
(45) Date of Patent: Oct. 17, 2006

(54) PISTON RING

(75) Inventors: Hassan Asadi, Schweinfurt (DE); Gerald Fenn, Pfersdorf (DE)

(73) Assignee: ZF Sachs AG, Schweinfurt (DE)

( * ) Notice: Subject to any disclaimer, the term of this patent is extended or adjusted under 35 U.S.C. 154(b) by 100 days.

(21) Appl. No.: 10/727,741

(22) Filed: Dec. 4, 2003

(65) Prior Publication Data

US 2004/0140624 A1  Jul. 22, 2004

(30) Foreign Application Priority Data

Dec. 5, 2002  (DE) ................ 102 56 765

(51) Int. Cl.
*F16J 9/14* (2006.01)
(52) U.S. Cl. ............... 277/437; 277/496; 277/498
(58) Field of Classification Search .......... 277/435, 277/437, 469–9; 92/201; 188/322.17, 322.18, 188/322.22
See application file for complete search history.

(56) References Cited

U.S. PATENT DOCUMENTS

| 1,181,618 | A | * | 5/1916 | Smith ............... 277/498 |
| 1,211,692 | A | * | 1/1917 | Endebrock et al. ...... 277/499 |
| 1,390,577 | A | * | 9/1921 | Nagy ............... 277/498 |
| 1,392,536 | A | * | 10/1921 | Syfert ............ 277/441 |
| 2,485,862 | A | * | 10/1949 | Caza ............... 277/496 |
| 2,994,571 | A | * | 8/1961 | Peras ............... 277/437 |
| 4,881,455 | A | * | 11/1989 | Hirose ............ 92/248 |
| 5,372,488 | A | * | 12/1994 | Turner ............ 417/554 |
| 5,615,756 | A | * | 4/1997 | Grundei et al. ...... 188/322.15 |
| 5,785,160 | A | * | 7/1998 | Grundei ........... 188/322.15 |
| 6,176,492 | B1 | * | 1/2001 | Sawai ............. 277/461 |
| 6,719,297 | B1 | * | 4/2004 | Fenn et al. ....... 277/434 |
| 6,863,277 | B1 | * | 3/2005 | Wirth et al. ...... 277/434 |
| 2002/0043768 | A1 | | 4/2002 | Fenn et al. |

FOREIGN PATENT DOCUMENTS

DE  100 41 954 C1  2/2002

* cited by examiner

*Primary Examiner*—Alison K. Pickard
(74) *Attorney, Agent, or Firm*—Cohen, Pontani, Lieberman & Pavane

(57) ABSTRACT

A piston ring includes a lateral surface which covers a circumferential surface of a piston and support segments with retaining surfaces which engage with the top and bottom of the piston. A piston ring joint allows the piston ring to be elastically deformed in the radial direction and is provided with a tongue at one end of the lateral surface, which tongue engages in an opening in the other end of the lateral surface. The tongue is designed with retaining segments which extend in the circumferential direction and continue as extensions of the support segments. The retaining segments engage supportively with the top and bottom of the piston. The opening is provided with carrier segments at least in certain areas of the circumference of the piston ring extensions of the support segments and holding the ends of the piston ring in place axially with respect to the piston, the carrier segments being supported in the axial direction of the piston on the retaining segments. The piston ring joint of the piston ring has at least one sealing surface between the ends of the piston ring.

5 Claims, 7 Drawing Sheets

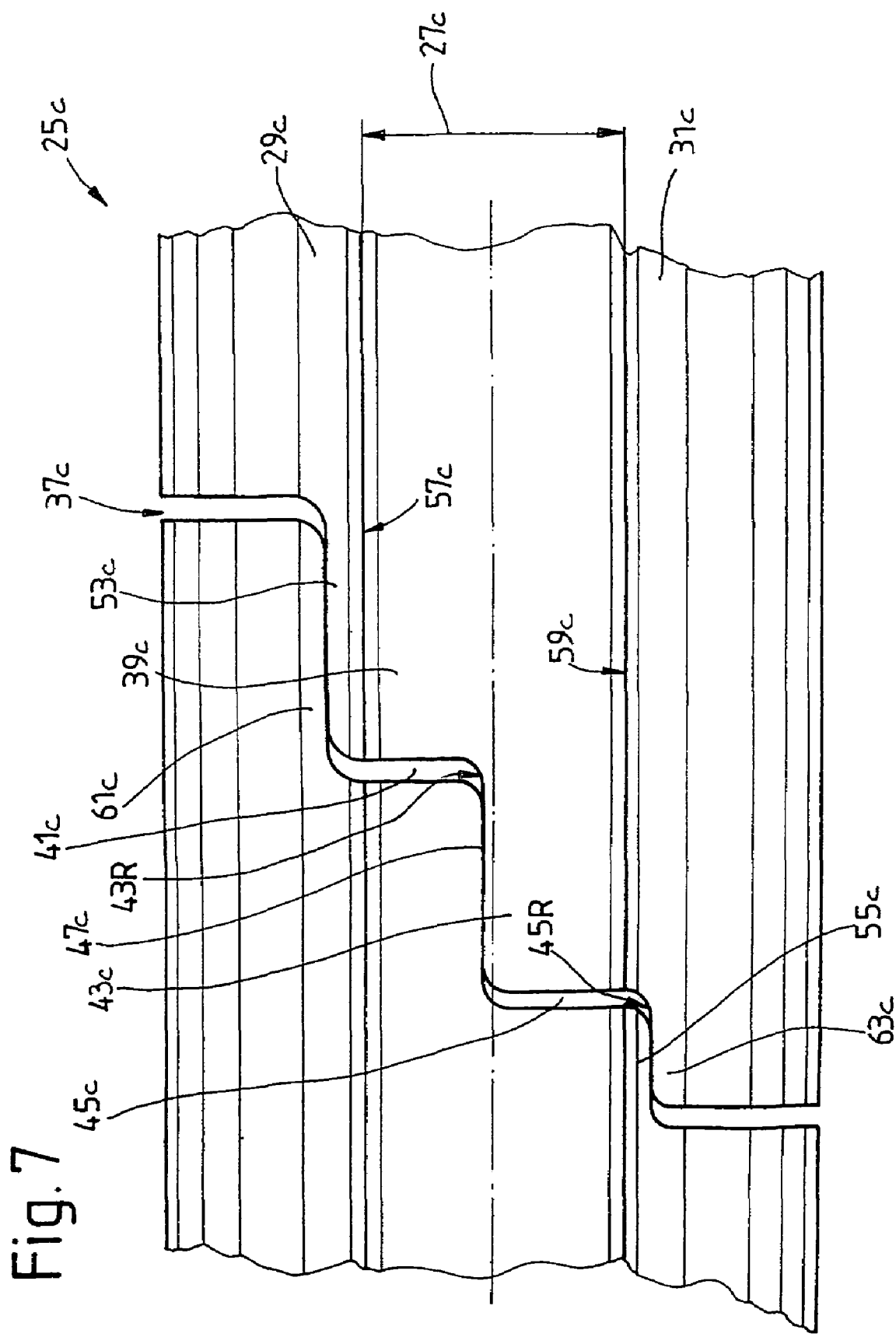

PISTON RING

BACKGROUND OF THE INVENTION

1. Field of the Invention

The invention relates to a piston ring which covers a circumferential surface of a piston and in which retaining surfaces of the piston ring engage the top and bottom of the piston.

2. Description of the Related Art

U.S. Patent Application Publication No. US 2002/0043768 discloses a piston ring for covering a circumferential surface of a piston, i.e., a flat piston of a vibration damper. To improve the sealing function, the piston ring disclosed by this reference includes support segments with retaining surfaces in the area of the piston ring joint. However, if there is an unfavorable combination between the tolerance field for the diameter of the piston with the piston ring and the tolerance field of the cylinder of the vibration damper, a leakage gap may form in the area of the joint, which reveals itself as a wide range of variation in the damping forces at very high damping force values. It would, of course, be possible to specify even narrower tolerance fields. However, the piston ring is preferably an injection-molded plastic part and the manufacturing tolerances of the production process determine the limits of the tolerance fields. If the tolerance fields were to be narrowed too much, the production of the piston rings would be associated with a disproportionate increase in the amount of waste.

SUMMARY OF THE INVENTION

The object of the present invention is to provide a piston ring for flat pistons in which a constant seal is ensured even when the piston is under extreme hydraulic loads.

The object of the invention is met by a piston ring having a lateral surface for covering a circumference of a piston, the piston ring defining a joint between two ends of the ring which allows the ring to expand radially for assembly of the ring onto the piston. At least one sealing surface is arranged at the joint between the ends of the piston ring within the axial extent of the lateral surface, wherein the sealing surface extends in the circumferential direction of the piston ring.

The leakage flow through the piston ring joint between the top and bottom of the piston which occurs in the known devices is effectively eliminated by providing the sealing surface between the ends of the piston ring. The sealing surface is designed within the axial extent of the lateral surface of the piston ring which faces the circumferential surface of the piston. Thus, in the case of a more-or-less strongly pretensioned piston ring, there will not be a direct flow connection between the top and bottom of the piston.

In a first embodiment, the piston ring is provided at the joint with a first tongue fitting into a first opening and a second tongue fitting into a second opening. The first tongue includes retaining segments for engaging to top and bottom of the piston to prevent the piston ring from shifting axially on the piston during movement of the piston. In addition, the retaining segments also provide the piston ring with very good dimensional accuracy. The second tongue and the second opening together form the sealing surface and thus also prevent even very small leaks through piston ring joint.

The second tongue may, for example, be in series with the first tongue. Even in the case of a very flat piston, e.g., when the thickness of the piston small and therefore the lateral surface of the piston ring is rather narrow, the second tongue can still be made comparatively wide and is uncritical with respect to the allowable load capacity.

Alternatively, the two ends of the piston ring in the area of the piston ring joint may each be provided with an opening and a tongue, the second tongue being oriented in the direction opposite that of the first tongue. In this embodiment, the joint of the piston ring extends over a comparatively short circumferential distance.

In addition, the second tongue is shorter in the circumferential direction than the first tongue. The second tongue is therefore subjected to smaller transverse loads, which are applied by, for example, compressive forces acting from the top or bottom of the piston.

A joint contour of especially accurate shape may be achieved when the two tongues extend the way from one side of the piston toward the sealing surface and have support segments with retaining surfaces which engage with the top and bottom of the piston.

The strength of the piston ring in the area of the joint may be optimized by providing the joint with a step-like contour at least within the area of the lateral surface. Tongues and openings will still be provided in the joint in this case, but each of the tongues will then have two connecting edges for the piston ring.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views:

FIG. 7 is a partial sectional view of an inner side of a piston ring in the area of the joint according to yet another embodiment of the present invention.

DETAILED DESCRIPTION OF THE PRESENTLY PREFERRED EMBODIMENTS

Figure 1:
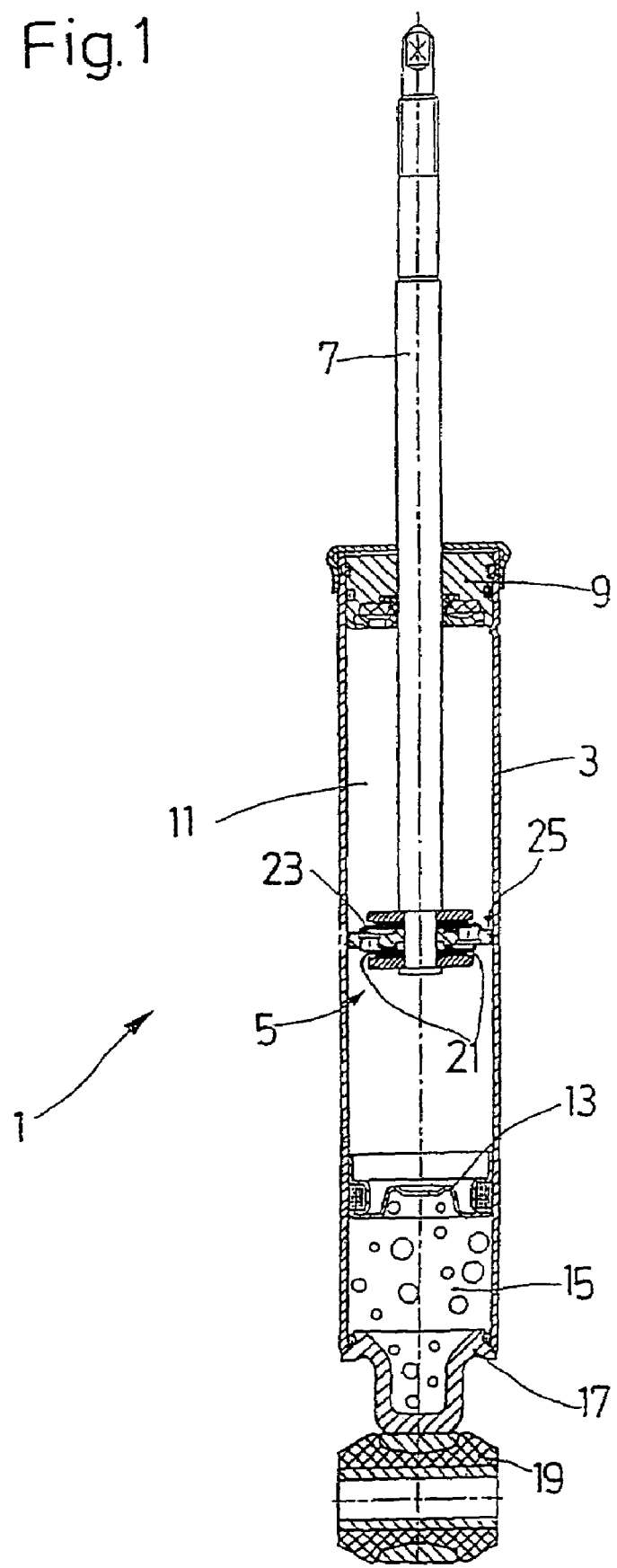
FIG. 1 is a longitudinal sectional view of a vibration damper in which a piston ring according to the present invention may be used.

FIG. 1 shows by way of example a piston-cylinder unit comprising a single-tube vibration damper 1 in which the inventive piston ring may be arranged. Although the single-tube vibration damper is shown, the invention is also applicable to other types of piston-cylinder units.

The single-tube vibration damper 1 includes a pressure tube 3. A piston 5 on a piston rod 7 is installed in the pressure tube 3 with freedom of axial movement. One end of the piston rod 7 extends out of the pressure tube 3 through a piston rod guide 9. A working space 11 which is filled with damping medium is closed by the pressure tube 3 and the piston rod guide 9. The working space 11 is separated by a separating piston 13 from a gas space 15 arranged at a bottom end of the pressure tube 3. A mounting ring 19 is arranged at the bottom of the pressure tube 3.

When the piston rod 7 moves, damping medium in the working space 11 is displaced through damping valves 21 in the piston 5 which are formed by valve disks 23. A piston ring 25 covers a radially outward facing circumferential surface 23 of the piston 5 and prevents the medium from flowing laterally around the piston 5.

Figure 2:
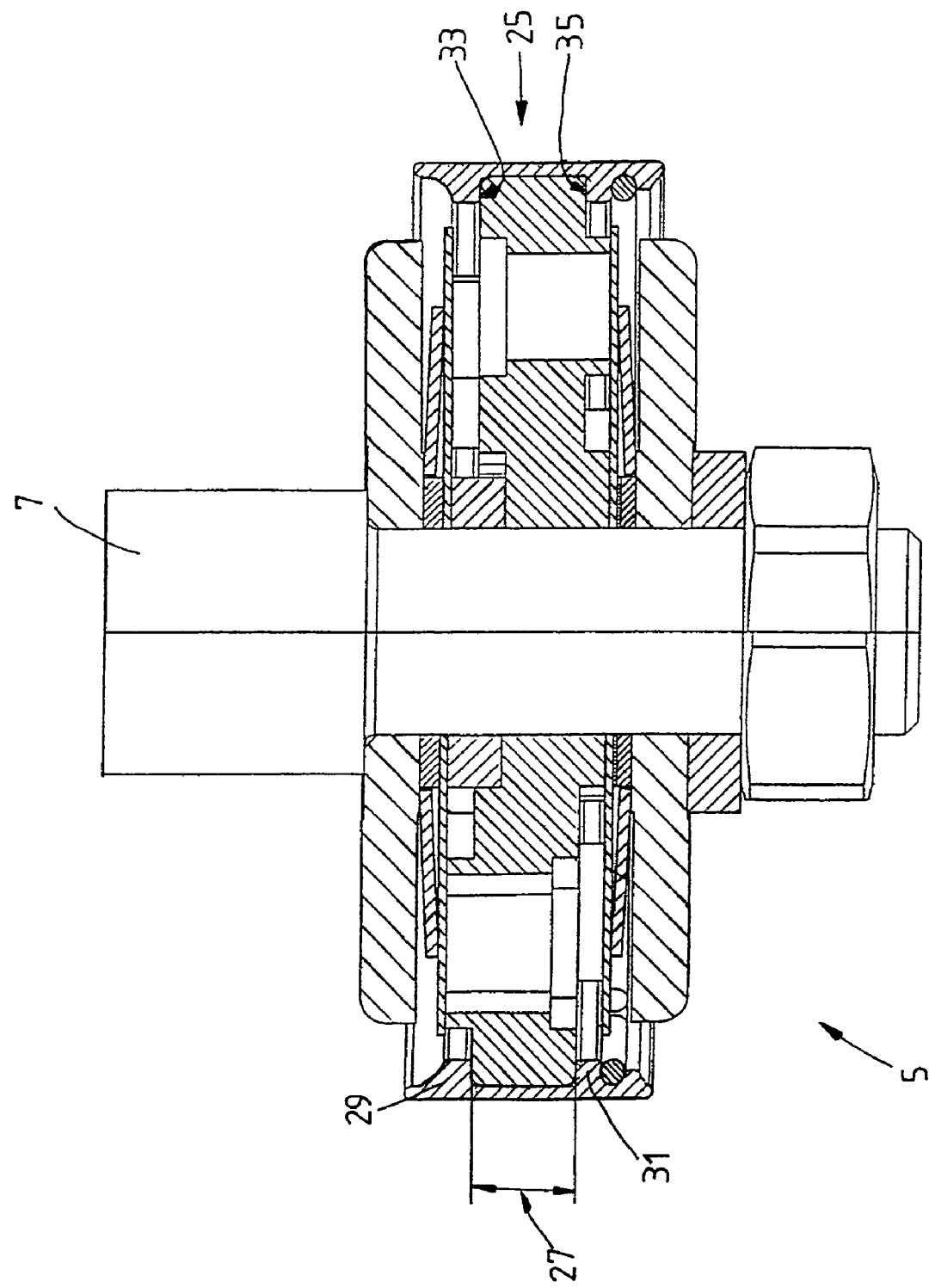
FIG. 2 is a longitudinal sectional view of a piston assembly of the vibration damper of FIG. 1.

FIG. 2 shows the piston 5 of FIG. 1 on the piston rod 7. A lateral surface 27 of the piston ring 25 covers the circumferential surface 23 of the of the piston 5. The piston ring 25 has a U-shaped cross section with support segments 29, 31 which extend out from the lateral surface 27. Retaining surfaces 33, 35 of the support segments 29, 31 engage with the top and bottom of the piston 5 and hold the piston ring 25 axially in place on the piston 5.

Figure 3:
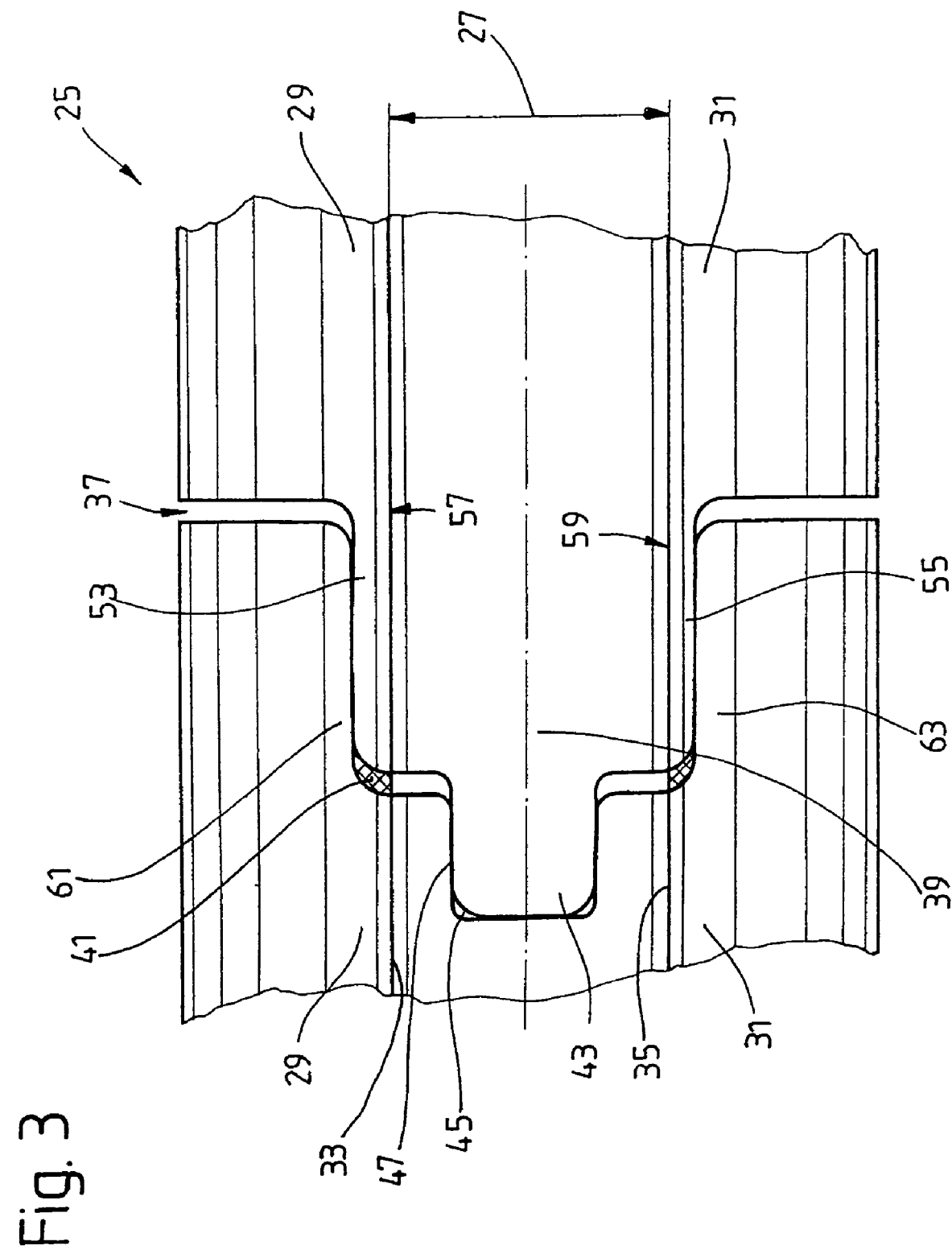
FIG. 3 is a partial view of an inner side of a piston ring in the area of the joint according to an embodiment of the present invention.

FIG. 3 shows an inner side of the piston ring 25 viewed radially outward from the inside of the piston ring. The piston ring 25 includes a joint 37 which has a first tongue 39 extending in the circumferential direction and a corresponding first opening 41, so that the piston ring 25 can be expanded radially to allow assembly. Within the axial extent of the lateral surface 27, a second tongue 43 is arranged in series with the first opening 41 and the first tongue 39. The second tongue engages a second opening 45. The second tongue 43 and the second opening 45 form a sealing surface 47 within the area of the lateral surface 27, the second tongue 43 being shorter in the circumferential direction than the first tongue 39.

The support segments 29, 31 are located at the edges of the lateral surface 27 which covers the circumferential surface 23 of the piston 5. The support segments 29, 31 of the lateral surface extend in the circumferential direction as retaining segments 53, 55 along the edge of the first tongue 39. The retaining segments 53, 55 of the first tongue have retaining surfaces 57, 59 which are functionally identical to the support segments 29, 31 of the rest of the piston ring. The retaining surfaces 57, 59 rest against the top and bottom of the piston 5. Thus, the first tongue 39 is held in a clearly defined axial position relative to the piston 5.

Figure 4:
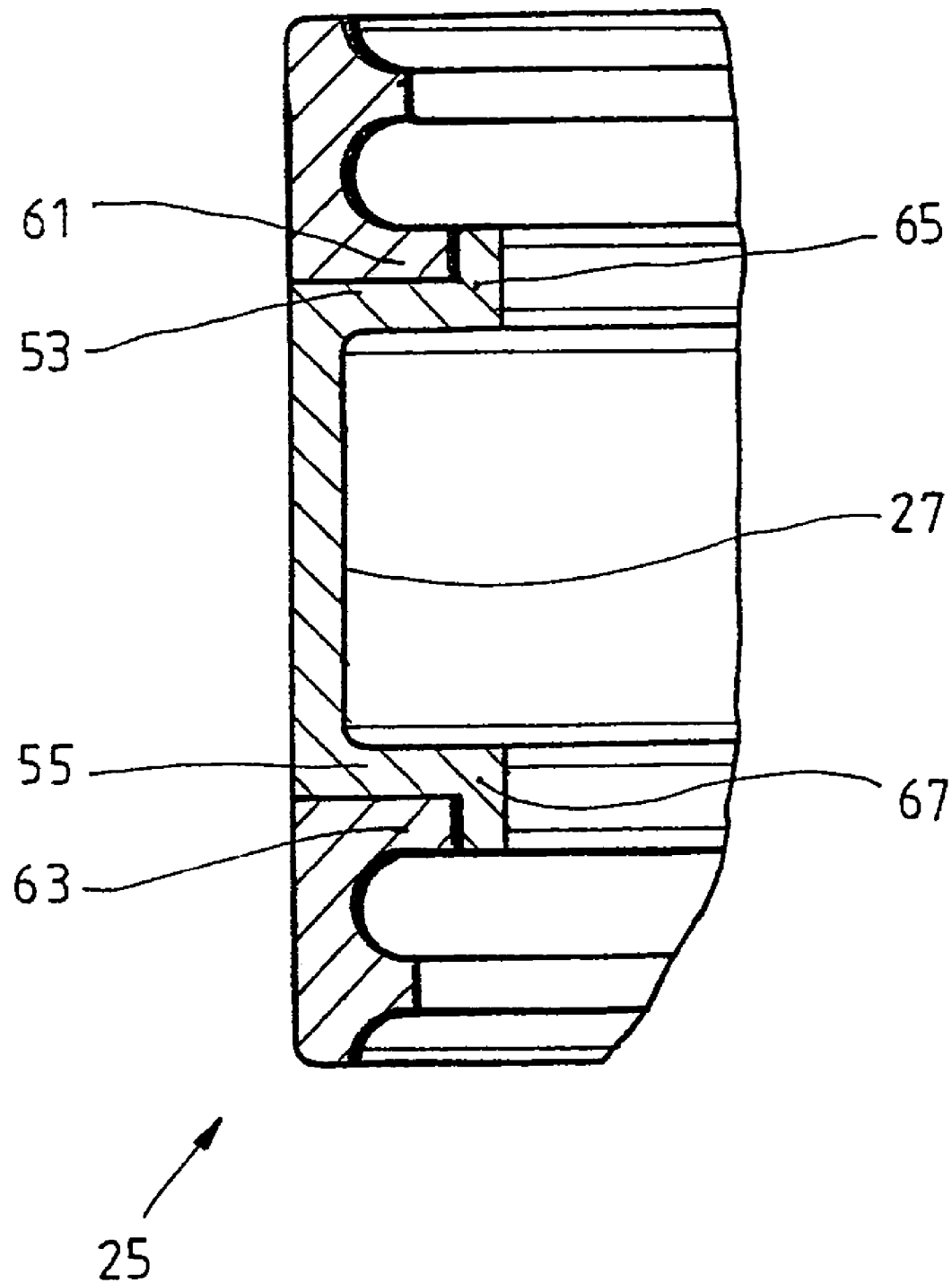
FIG. 4 is a sectional view through the piston ring of FIG. 3 in the area of the joint.

To axially support the end of the piston ring 25 having the first opening 41, carrier segments 61, 63 extending in the circumferential direction are provided at the first opening 41. When the joint 37 is closed, the carrier segments 61, 63 are supported axially on the retaining segments 53, 55 of the first tongue 39. The relationship between the carrier segments 61, 63 and retaining segments 53, 55 is shown in FIG. 4, which shows a cross section through the joint 37. The carrier segments 61, 63 of the first opening 41, which continue into the support segments 29, 31, close off an axially oriented butt joint between the forward end of the first tongue 39 and the inner end surface of the first opening 41.

Centering webs 65, 67 may also be provided on the radially inner side of the retaining segments 53, 55. The centering webs 65, 67 proceed from the first tongue 39 and engage radially with the carrier segments 61, 63. The first tongue 39 is thus prevented from expanding radially. If the centering webs 65, 67 are designed to extend over the entire length of the tongue 39, most of the butt joint extending in the circumferential direction can be closed.

The shaded areas in FIG. 3 show open butt joints between the first tongue 39 and the first opening 41 outside the lateral surface 27, one above the top of the piston, the other below the bottom, the size of which is a function of the tolerances of the piston ring, of the piston, and of the inside diameter of the cylinder. The damping medium can flow via the shaded cross sections between the first tongue and the first opening toward the other side of the piston. However, the sealing surfaces 47 extending in the circumferential direction of the piston ring between the second tongue 43 and the second opening 45 prevent the damping medium from reaching the other side. Thus leakage between the two sides of the piston 5 is effectively eliminated. To optimize the sealing action of the sealing surface 47, the height of the second tongue 43 is preferably designed to form a slight press-fit in the second opening 45. In any case, however, the goal will be to select the tolerances of the two tongues 39, 43 and of the two openings 41, 45 in such a way that the second tongue 43 can always form a sealing surface for the first tongue 43 and also so that the second tongue 43 will not be lifted up by the carrier segments 61, 63 on the retaining segments 53, 55.

Figure 5:
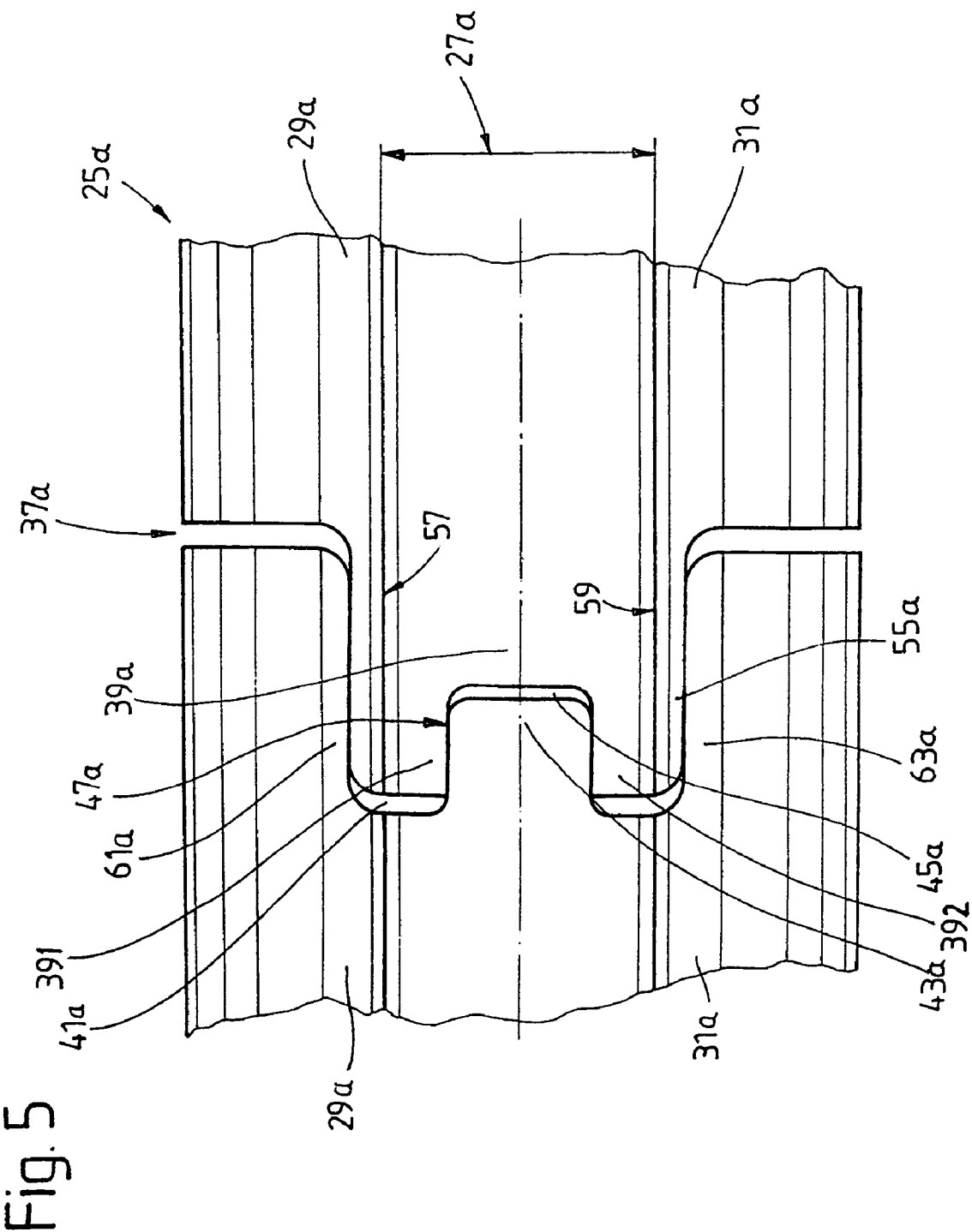
FIG. 5 is a partial sectional view of an inner side of a piston ring in the area of the joint according to a further embodiment of the present invention.

FIG. 5 shows a further embodiment of the present invention in which elements related to the above-described embodiment have the same reference characters with a suffix "a". In FIG. 5, a piston ring 25a includes a joint 37a between two ends thereof with a first tongue 39a engaging a first opening 41a and a second tongue 43a engaging a second opening 45a. The second tongue 43a is oriented in the direction opposite that of the first tongue 39a. The second opening 45a is inside the first tongue 39a so that the first tongue 39a includes two individual tongues 391, 392, which form the lateral boundaries of the second opening 45a. This embodiment offers an advantage with respect to the amount of space required, especially in the sense that the joint 37a occupies a smaller section of the circumference than the joint 37 in the previous emboidment.

Figure 6:
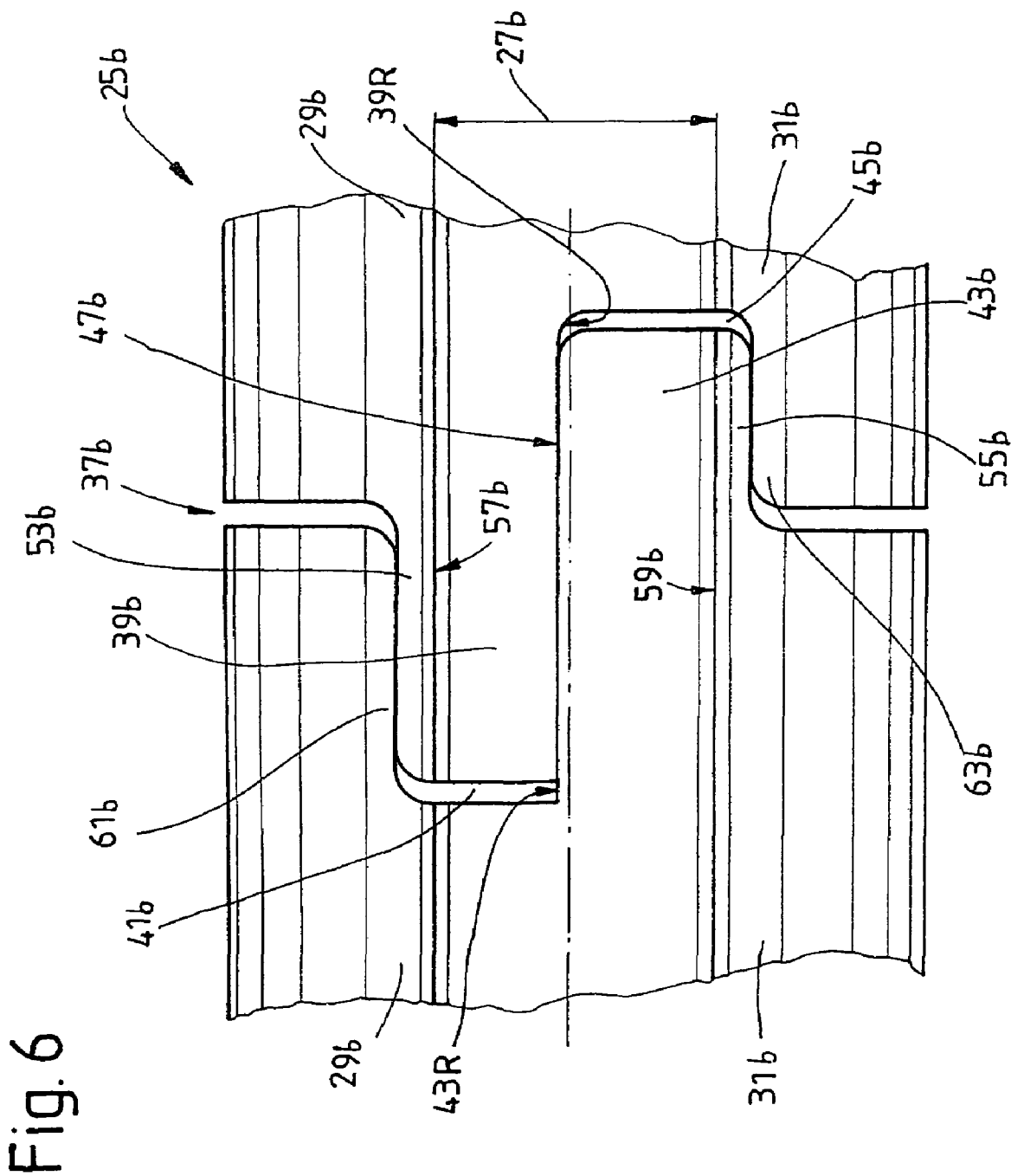
FIG. 6 is a partial sectional view of an inner side of a piston ring in the area of the joint according to another embodiment of the present invention.

FIG. 6 shows a further embodiment of the present invention in which elements related to the above-described embodiment have the same reference characters with a suffix "b". The first and second tongues 39b, 43b of this embodiment are also oriented in opposite directions. Each tongue 39b, 43b extends all the way from the top or bottom of the piston to the sealing surface 47b and each has one of the retaining segments 53b, 55b with retaining surfaces 57b, 59b which engage with the top and bottom of the piston 5b. Because retaining segments 53b, 55b are present on both tongues 39b, 43b, the load capacity is very high. In addition, the dimensional accuracy of the two tongues 39b, 43b can be maintained with considerable precision. The sealing surface 47b may also be considerably larger than that which is possible in the embodiments according to FIGS. 3 and 5, because the facing edges 39R, 43R of the first and second tongues 39b, 43b form the sealing surface 47b, and because the size of this surface is determined by the length of the arc extending from the end surface of the first tongue 39b to the end surface of the second tongue 43b.

FIG. 7 shows yet another embodiment of the present invention in which elements related to the above-described embodiment have the same reference characters with a suffix "c". This embodiment combines the advantages of the embodiments according to FIGS. 5 and 6. Thus, a piston ring joint 37c has a step-like contour at least within the area of the lateral surface 27c. Accordingly, a first tongue 39c and a second tongue 43c are arranged in series in the circumferential direction. The two tongues 39c, 43c have retaining segments 53c, 55c with retaining surfaces 57c, 59c. The first and second openings 41c, 45c which engage the first and second tongues 39c, 43c are also adjacent to each other. An edge of each of the two tongues 39c, 43c contacts an edge of an opening, wherein the edge 43R of the second tongue 43c and the edge 45R of the second opening 45c form the sealing surface 47c.

Because each tongue 39c, 43c rests against only one side of an opening, the piston ring 25c can be produced very easily. In addition, the tolerances for maintaining the sealing surface 47c can also be determined in a favorable manner.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A piston ring for covering a circumferential surface of a piston, comprising a lateral surface for covering the circumferential surface of the piston and support segments having retaining surfaces for engaging the top and bottom of the piston, wherein said piston ring defines a joint between ends thereof allowing the piston ring to be elastically deformed in the radial direction, a first tongue arranged on one of said ends of said piston ring, said first tongue engaging an opening defined in the other of said ends of said piston ring, wherein said first tongue includes retaining segments which comprise extensions of said support segments in the circumferential direction, said retaining segments supportively engagable with the top and bottom of the piston for axially supporting said first tongue, said piston ring further comprising carrier segments arranged proximate the opening as extensions of said support segments for axially supporting said other of said ends of said piston ring, said carrier segments being supported on the retaining segments, and a second tongue at said joint which engages a second opening, said first and second tongues being radially equidistant from a center axis of said piston ring, said second tongue and said second opening forming a sealing surface between the ends of said piston ring for preventing damping fluid from flowing through the joint between the top of the piston and the bottom of the piston, wherein an entire axial extent of said second tongue is arranged in an area of said lateral surface between said support segments.

2. The piston ring of claim 1, wherein said second tongue is in series with said first tongue.

3. The piston ring of claim 1, wherein said second tongue is arranged in said other of said ends and the second opening is defined in said one of said ends, wherein said second tongue is oriented in a direction opposite that of said first tongue.

4. The piston ring of claim 3, wherein said second tongue is shorter in the circumferential direction of said piston ring than said first tongue.

5. A piston ring for covering a circumferential surface of a piston, comprising a lateral surface for covering the circumferential surface of the piston and support segments having retaining surfaces for engaging the top and bottom of the piston, wherein said piston ring defines a joint between ends thereof allowing the piston ring to be elastically deformed in the radial direction, a first tongue arranged on one of said ends of said piston ring, said first tongue engaging an opening defined in the other of said ends of said piston ring, wherein said first tongue includes retaining segments which comprise extensions of said support segments in the circumferential direction, said retaining segments supportively engagable with the top and bottom of the piston for axially supporting said first tongue, said piston ring further comprising carrier segments arranged proximate the opening as extensions of said support segments for axially supporting said other of said ends of said piston ring, said carrier segments being supported on the retaining segments, and a second tongue at said joint which engages a second opening, said first and second tongues being radially equidistant from a center axis of said piston ring, said second tongue and said second opening forming a sealing surface between the ends of said piston ring for preventing damping fluid from flowing through the joint between the top of the piston and the bottom of the piston, wherein said second tongue is shorter in the circumferential direction of said piston ring than said first tongue.

* * * * *